(12) United States Patent
Suzuki et al.

(10) Patent No.: US 7,887,402 B2
(45) Date of Patent: Feb. 15, 2011

(54) GAME DEVICE, COMPUTER CONTROL METHOD, AND INFORMATION STORAGE MEDIUM

(75) Inventors: Eiji Suzuki, Minato-ku (JP); Tadakatsu Izumi, Minato-ku (JP); Ippei Kondo, Minato-ku (JP); Atsushi Mizutani, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 849 days.

(21) Appl. No.: 11/792,236

(22) PCT Filed: Jul. 4, 2005

(86) PCT No.: PCT/JP2005/012342
§ 371 (c)(1),
(2), (4) Date: Jun. 4, 2007

(87) PCT Pub. No.: WO2006/061922
PCT Pub. Date: Jun. 15, 2006

(65) Prior Publication Data
US 2008/0234022 A1  Sep. 25, 2008

(30) Foreign Application Priority Data
Dec. 10, 2004  (JP) .............. 2004-358490

(51) Int. Cl.
*A63F 13/00* (2006.01)
*G06F 17/00* (2006.01)
*A63F 9/24* (2006.01)

(52) U.S. Cl. .......... 463/3; 463/1; 463/31; 463/50; 273/108.1; 273/317.1; 273/317.3; 273/340; 273/366; 345/467; 345/636; 345/655; 348/14.15; 348/141

(58) Field of Classification Search ........... 463/1–5, 463/7–9, 30–34, 36–39, 40–43, 49–57; 273/108.1, 273/127 R, 148 R, 148 B, 309, 317.1, 340, 273/343, 348, 361–367, 461, 317.3, 317.4, 273/317.5, 317.6; 345/1.1–1.3, 2.1–2.3, 345/3.1–3.4, 24, 419, 467–469, 473, 539, 345/543–544, 625, 636, 638, 653–656, 664–666, 345/682–683, 686, 949–950, FOR. 139, FOR. 153; 348/14.15, 39, 42, 47–52, 115, 117, 121, 348/135–137, 141, 211.2, 211.4, 211.7–211.8, 348/211.14, 211.99, 576, 588–589, 719, 348/721, 734, E13.004, E13.064–E13.067; 375/240.15–240.16, 240.25; 434/37–38, 434/43–44, 69, 118, 240, 256–257
See application file for complete search history.

(56) References Cited

U.S. PATENT DOCUMENTS

| | | | | |
|---|---|---|---|---|
| 5,146,557 A | * | 9/1992 | Yamrom et al. | 715/723 |
| 6,217,444 B1 | * | 4/2001 | Kataoka et al. | 463/3 |
| 6,273,814 B1 | * | 8/2001 | Komoto | 463/7 |
| 6,394,896 B2 | * | 5/2002 | Sugimoto | 463/3 |
| 6,461,237 B1 | * | 10/2002 | Yoshinobu et al. | 463/3 |
| 6,524,187 B2 | * | 2/2003 | Komata | 463/37 |
| 6,585,599 B1 | * | 7/2003 | Horigami et al. | 463/43 |
| 6,589,117 B1 | * | 7/2003 | Moritome et al. | 463/37 |
| 6,729,960 B1 | * | 5/2004 | Matsuno | 463/30 |
| 7,223,169 B2 | * | 5/2007 | Imaeda et al. | 463/3 |
| 2001/0008840 A1 | | 7/2001 | Sugimoto | |
| 2001/0008851 A1 | | 7/2001 | Komata | |
| 2002/0165027 A1 | * | 11/2002 | Kaminagayoshi | 463/43 |
| 2002/0173350 A1 | * | 11/2002 | Kaneda | 463/3 |
| 2004/0176165 A1 | | 9/2004 | Takahashi et al. | |
| 2004/0180709 A1 | | 9/2004 | Takahashi et al. | |
| 2004/0193331 A1 | * | 9/2004 | Kashiwada et al. | 701/1 |
| 2004/0214623 A1 | | 10/2004 | Takahashi et al. | |
| 2004/0248630 A1 | * | 12/2004 | Hodgson et al. | 463/3 |

FOREIGN PATENT DOCUMENTS

| | | | |
|---|---|---|---|
| JP | 2002-292131 A | | 10/2002 |
| JP | 2003-519547 A | | 6/2003 |
| JP | 2003-265859 A | | 9/2003 |
| JP | 2003265859 A | * | 9/2003 |
| JP | 2004167173 A | | 6/2004 |
| JP | 2004-216165 A | | 8/2004 |

| | | | |
|---|---|---|---|
| JP | 2004-290657 A | 10/2004 |
| JP | 2004275221 A | 10/2004 |
| JP | 2004-321303 A | 11/2004 |

OTHER PUBLICATIONS

XP-002457960 "LINKS 2004" Game Manual [online], Nov. 11, 2003, Microstoft Game Studios.
XP-002457959 "LINKS 2004 Release Date Data" Gamespot Gamefaqs, Nov. 11, 2003 [online], Microsoft Game Studios.
"Konami Official Guide Perfect Series J. League Jikkyo Winning Eleven 2001 Perfect Guide", 1st edition, Aug. 2001, p. 24-34, Konami Co., Ltd.
Fighting Studio et al., "Gamecube Kanpeki Korayaku Series 3 Virtua Striker 3 ver. 2002 Road to International Cup Kyukyoku Guide", 1st edition, Yu Morokado, Mar. 25, 2002, p. 10-17.
Fifa 2004, Instruction Manual and release date information, EA Games, Oct. 15, 2003.
Chinese Patent Application No. 200580042353.7 dated Jun. 5, 2009 (with translation).
European Paten Application No. 05765270.3 dated Jun. 24, 2009 (English).

* cited by examiner

*Primary Examiner*—David L. Lewis
*Assistant Examiner*—Arthur O. Hall
(74) *Attorney, Agent, or Firm*—Sughrue Mion, PLLC (57) ABSTRACT

To provide a game device for presenting to a player inputting the amount of operation while utilizing a gauge, the length of a gauge which corresponds to a desired amount of operation. In a game device in which an object placed in a virtual three dimensional space is moved by a distance according to the displayed length of the gauge when the player carries out a predetermined operation, a target position to which the object is going to be moved is obtained (S102), a distance between the target movement position and the present position of the object is calculated (S103), and the length of the gauge corresponding to the calculated distance L is calculated based on the distance L (S104). Then, the target length of the gauge is presented based on the calculated length of the gauge (S105).

10 Claims, 9 Drawing Sheets

GAME DEVICE, COMPUTER CONTROL METHOD, AND INFORMATION STORAGE MEDIUM

TECHNICAL FIELD

The present invention relates to a game device, a computer control method, and an information storage medium, and in particular to an operation input using a gauge.

BACKGROUND ART

A gauge is often used as a measurement unit to simplify input by a computer of an amount of operation. In this case, a gauge which varies in length as time passes is displayed. The computer monitors whether or not the user carries out a predetermined operation, and when a predetermined operation is completed, carries out a process in accordance with the length of the gauge at that time.

For example, in a ball game, such as a golf game, a soccer game, or the like, a ball object and a player object are placed in a virtual three dimensional space. Then, a picture obtained by viewing the virtual three dimensional space from the view point defined in the virtual three dimensional space is displayed on a game screen. In this case, a gauge desirably appears on the game screen, extending longer or shorter as time passes. Then, in response to a predetermined operation carried out by a player, for example, pressing a button or releasing the pressed button, the player object moves (shot, putt, pass, shoot, or the like) the ball object by a distance in accordance with the length of the gauge at that time.

Japanese Patent Application No. 2004-275221(A)

DISCLOSURE OF THE INVENTION

Problems to be Solved by the Invention

Conventionally, however, the player has no way to know well in advance the length of the gauge at the time when they ought to carry out a predetermined operation in order to move the ball object by a desired distance. Therefore, the player has no other choice but to operate relying on their intuition, such as "strong", "weak", and "medium".

The present invention has been conceived in view of the above, and one of the objects thereof is to provide a game device, a computer control method, and an information storage medium for presenting to the player the desirable length of a gauge when the player inputs the amount of operation by a gauge.

Means for Solving the Problems

In order to solve the above described problems, according to one aspect of the present invention, there is provided a game device, having gauge display means for displaying a gauge which changes a length thereof as time passes; monitor means for monitoring whether or not a player carries out a predetermined operation; and object moving means for moving an object placed in a virtual three dimensional space in the virtual three dimensional space by a distance according to the length of the gauge displayed by the gauge display means in a case where the player carries out the predetermined operation, the game device comprising: focused position acquisition means for obtaining a focused position on a movement path of the object; distance calculation means for calculating a distance between the focused position obtained by the focused position acquisition means and a present position of the object; gauge length calculation means for calculating a length of the gauge corresponding to the distance based on the distance calculated by the distance calculation means; and guidance means for presenting the length of the gauge to which the gauge displayed by the gauge display means aims to be set, based on the length calculated by the gauge length calculation means.

According to another aspect of the present invention, there is provided a computer control method, having a gauge display step of displaying a gauge which changes a length thereof as time passes; a monitor step of monitoring whether or not a player carries out a predetermined operation; and an object moving step of moving, in a case where the player carries out the predetermined operation, an object placed in a virtual three dimensional space in the virtual three dimensional space by a distance according to the length of the gauge displayed by the gauge display step, the computer control method comprising: a focused position acquisition step of obtaining a focused position on a movement path of the object; a distance calculation step of calculating a distance between the focused position obtained by the focused position acquisition step and a present position of the object; a gauge length calculation step of calculating a length of the gauge corresponding to the distance based on the distance calculated by the distance calculation step; and a guidance step of presenting the length of the gauge to which the gauge displayed by the gauge display step aims to be set, based on the length calculated by the gauge length calculation step.

The computer may be, for example, a consumer game machine, a commercial game device, a portable game device, a personal computer, a server computer, a portable phone, a portable digital assistance, and so forth.

According to another aspect of the present invention, there is provided a program causing a computer, such as a consumer game machine, a commercial game device, a portable game device, a personal computer, a server, a portable phone, a portable digital assistance, or the like, to function as gauge display means for displaying a gauge which changes a length thereof as time passes; monitor means for monitoring whether or not a player carries out a predetermined operation; object moving means for moving an object placed in a virtual three dimensional space in the virtual three dimensional space by a distance according to the length of the gauge displayed by the gauge display means in a case where the player carries out the predetermined operation; focused position acquisition means for obtaining a focused position on a movement path of the object in a case where the player carries out the predetermined operation; distance calculation means for calculating a distance between the focused position obtained by the focused position acquisition means and a present position of the object; gauge length calculation means for calculating a length of the gauge corresponding to the distance based on the distance calculated by the distance calculation means; and guidance means for presenting the length of the gauge to which the gauge displayed by the gauge display means aims to be set, based on the length calculated by the gauge length calculation means.

The program may be stored in a computer-readable information storage medium, such as a CD-ROM, a DVD-ROM, a ROM card, or the like.

In the above, a focused position of an object on a movement path is obtained, and a distance between that position and the position of the object is calculated. In the above, the position of the object includes not only the position set on the object, but also a position set on another object which moves following the object. Then, the length of the gauge which corresponds to the distance obtained as described above is calculated, and based on the length, a target length of the gauge is presented.

According to the present invention, in inputting of an operation while utilizing a gauge, the length of the gauge in association with the focused position can be presented to the player.

In the above, the focused position acquisition means may obtain the focused position on the movement path based on a position of another object placed in the virtual three dimensional space and the movement path.

The focused position may be a position corresponding to another object on the movement path, for example, a position where the position of another object is projected onto the movement path, or the like.

Alternatively, in the case where the movement path passes through the position of one or more other objects, the position of the other object itself may be used as a focused position.

According to the present invention, the length of the gauge according to the distance to the focused position on the movement path in association with the other object can be presented to the user.

Also, in the above, the guidance means may calculate a distance between the position of the other object and the movement path, and display an image expressed in a manner according to the distance in the position in the gauge, which is in accordance with the length calculated by the gauge length calculation means.

The image expressed in the manner according to the distance may be an image having a size or color determined according to the distance. Alternatively, an image having a flashing rate determined according to the distance is similarly applicable, as well as an image having a degree of transparency determined according to the distance.

According to the present invention, a distance between the position of the other object and the movement path can be determined based on the manner of expression of the image.

In the above, the game device may be formed as a soccer game, a ball object representative of a ball and a plurality of player objects respectively representative of a plurality of players may be placed in the virtual three dimensional space, the object moving means may move the ball object, and the focused position acquisition means may obtain the focused position based on a position of the player object. This arrangement can facilitate operation in a soccer game, such as, pass, shoot, or the like, in connection with the movement of the ball object.

BEST MODE FOR CARRYING OUT THE INVENTION

In the following, an embodiment of the present invention will be described with reference to the accompanying drawings.

Figure 1:
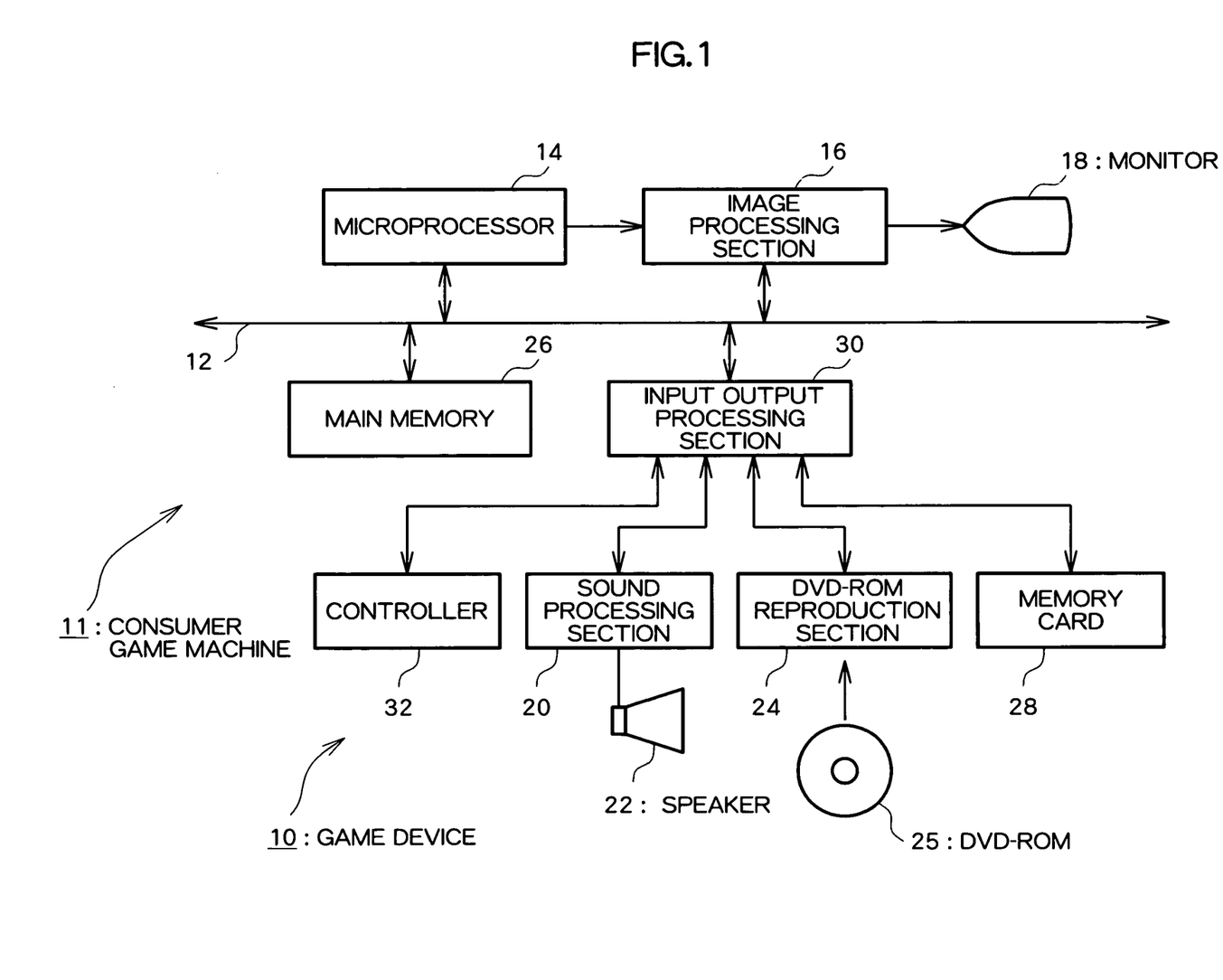
FIG. 1 is a diagram showing a hardware structure of a game device according to an embodiment of the present invention.

FIG. 1 is a diagram showing a hardware structure of a game device according to an embodiment of the present invention. A game device 10 shown in FIG. 1 is one embodiment of an image processing device according to the present invention, and constructed comprising a consumer game machine 11 connected to a monitor 18 and a speaker 22 and having a DVD-ROM 25 and a memory card 28, or information storage media, mounted therein, and having a monitor 18 and a speaker 22 connected thereto. The monitor 18 may be a home-use television set image receiver, and the speaker 22 may be a built-in speaker thereof.

It should be noted that although a DVD-ROM 25 is used here to supply a program to the consumer game machine 11, any other information storage medium, such as a CD-ROM, a ROM card, or the like, may be similarly used. Alternatively, a program may be supplied from a distant place via a data communication network, such as the Internet or the like, to the consumer game machine 11.

The consumer game machine 11 is a publicly known computer game system constructed comprising a microprocessor 14, an image processing section 16, a main memory 26, an input output processing section 30, a sound processing section 20, a controller 32, and a DVD-ROM reproduction section 24. The microprocessor 14, the image processing section 16, the main memory 26, and the input output processing section 30 are connected via a bus 12 for mutual data communication. The controller 32, the sound processing section 20, the DVD-ROM reproduction section 24, and the memory card 28 are connected to the input output processing section 30. The respective structural elements other than the controller 32 of the consumer game machine 11 are accommodated in an enclosure.

The microprocessor 14 effects control of the respective sections of the consumer game machine 11 based on an operating system stored in the ROM (not shown), a program read from the DVD-ROM 25, and saved data read from the memory card 28, and provides the player with a game. The bus 12 is used for exchanging an address and/or data among the respective sections of the consumer game machine 11. The main memory 26 is constructed comprising a RAM, for example, into which a program read from the DVD-ROM 25 and/or saved data read from the memory card 28 are written as required. The main memory 26 may also be used as a working memory of the microprocessor 14. The image processing section 16, which is constructed comprising a VRAM, receives image data sent from the microprocessor 14, renders a game screen image into the VRAM based on the received image data, converts the content of the received image data into a video signal, and outputs the video signal to the monitor 18 at a predetermined timing (every 1/60 second here).

The input output processing section 30 is an interface via which the microprocessor 14 accesses the controller 32, the sound processing section 20, the DVD-ROM reproduction section 24, and the memory card 28. The sound processing section 20 is constructed comprising a sound buffer, and reproduces and outputs, via the speaker 22, various sound data, such as game music, game sound effects, messages, and so forth, which is read from the DVD-ROM 25 and stored in the sound buffer. The DVD-ROM reproduction section 24 reads a program stored in the DVD-ROM 25 according to an instruction sent from the microprocessor 14. The controller 32 serves as a general purpose operation input means via which the player inputs various game operations. The memory card 28 comprises a nonvolatile memory (for example, EEPROM, or the like), and can be removed from the consumer game machine 11. The memory card 28 stores saved data, or the like, relevant to various games.

Figure 2:
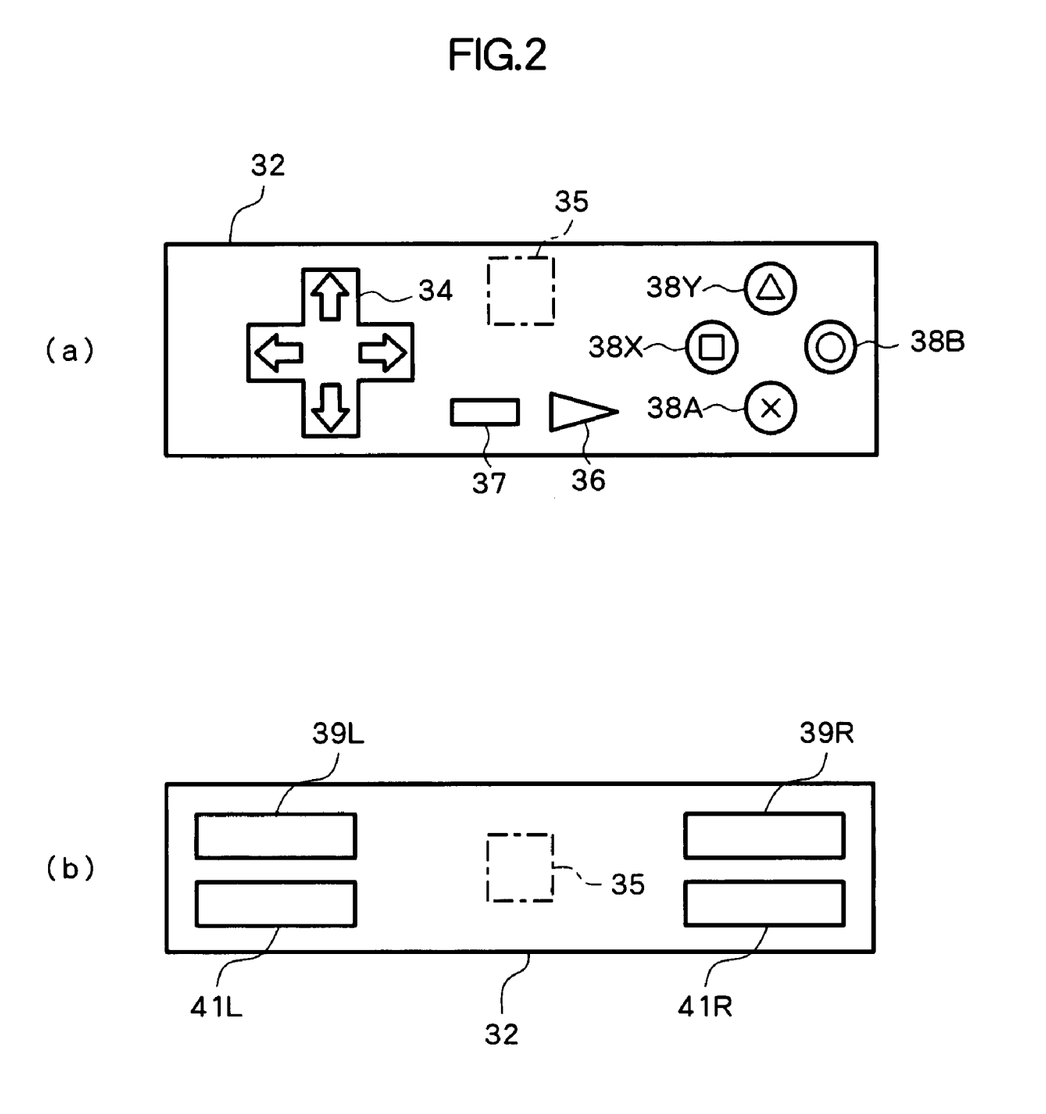
FIG. 2 is a diagram showing external appearance of a controller.

FIG. 2 is a diagram showing an external appearance of the controller 32. The controller 32 shown in FIG. 2 is a general purpose game controller, and as shown in FIG. 2(a) comprises a direction key 34, a start key 36, a selection key 37, and buttons 38X, 38Y, 38A, 38B, on its front surface, and as shown in FIG. 2(b), buttons 39L, 39R, 41L, 41R on the lateral surface on the further side from the player. That is, on the lateral surface on the further side of the controller 32, the buttons 41L, 41R are provided on the left and right sides on the front surface side; the buttons 39L, 39R are provided on the left and right sides on the rear surface side. The direction key 34 has a cruciform shape, and is generally used in designating a direction in which to move the character and/or cursor. The start key 36 is a small triangular press button, and is generally used to start and/or forcibly end a game. The buttons 38X, 38Y, 38A, 38B, 39L, 39R, 41L, 41R are used for carrying out other game operations. With the controller 32 operated, operation data describing the content of the operation is input to the consumer game machine 11.

The controller 32 incorporates an oscillator 35. The oscillator 35 is formed using a piezoelectric element or a motor having an eccentric weight, or the like, for example, and operates according to an oscillation-on instruction input from the microprocessor 14 to the controller 32 to cause the controller 32 to oscillate. Further, the oscillator 35 stops operation according to an oscillation-off instruction supplied from the microprocessor 14 to the controller 32, and causes the controller 32 to stop the oscillation.

Figure 3:
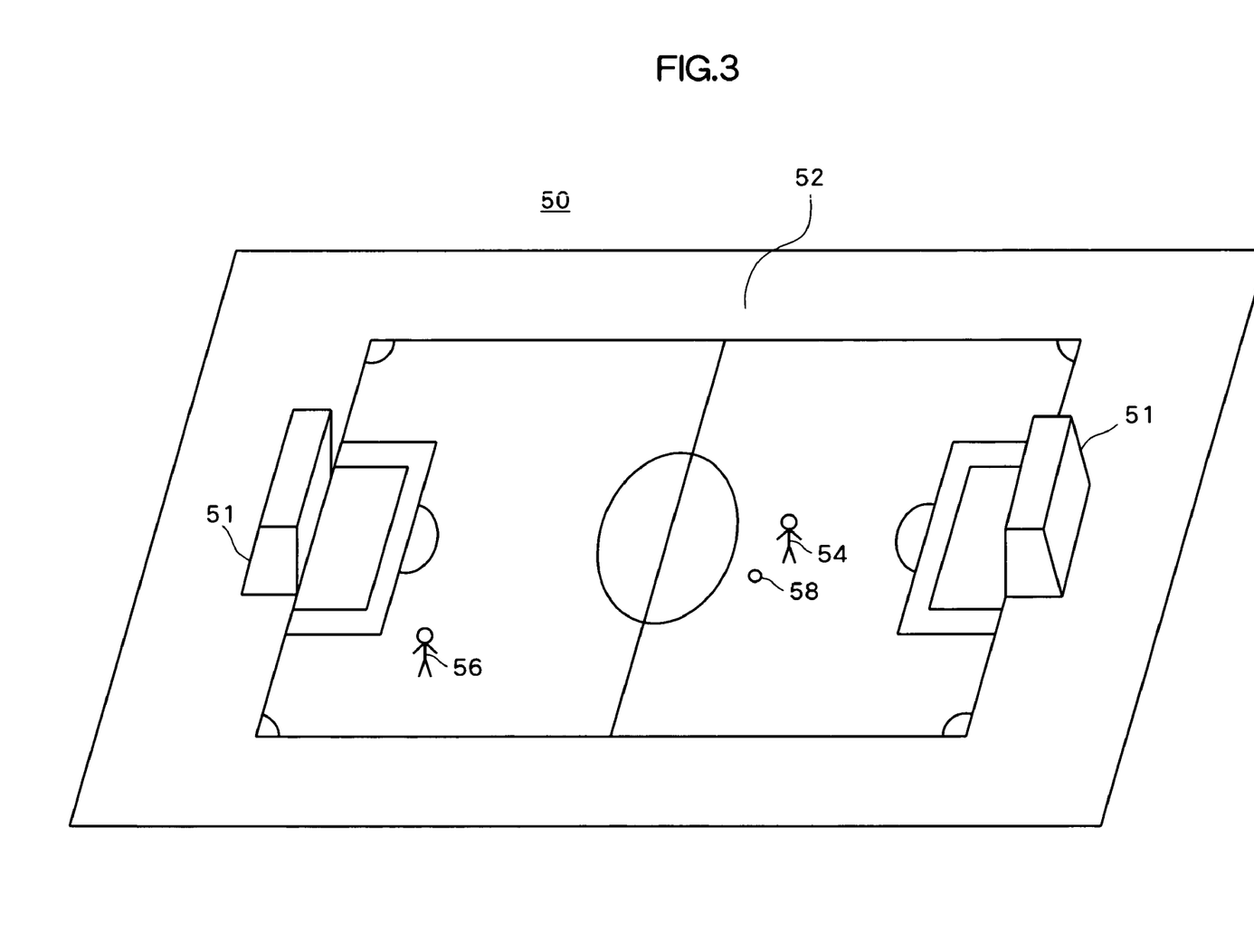
FIG. 3 is a perspective view showing one example of a virtual three dimensional space constructed in the main memory of the game device according to the embodiment of the present invention.

In the following, technique for realizing a soccer game will be described, using the game device 10 having the above-described hardware structure. In this soccer game, a virtual three dimensional space 50 where a soccer field object 52 is placed, as shown in FIG. 3, is constructed in the main memory 26. On the soccer field object 52, a goal object 51 representative of a soccer goal, a ball object 58 representative of a soccer ball, and player objects 54, 56 representative of soccer players are placed. It should be noted that although only the soccer player objects 54, 56 are shown in FIG. 3, twenty other soccer player objects are placed on the soccer field object 52.

The soccer player object 56 is an object whose motion is controlled according to a publicly known algorithm, for example; the soccer player object 54 is an object which moves on the soccer field object 52 according to an operation carried out using the controller 32. In particular, by pressing the button 38B of the controller 32 with the soccer player object 54 holding the ball object 58, it is possible to move the ball object 58 in the direction designated using the direction key 34. In the above, the distance by which the ball object 58 moves is determined according to the period of time for which the button 38B kept pressed.

In this game device 10, a gauge appears on the game screen when the button 38B of the controller 32 is pressed with the soccer player object 54 holding the ball object 58, and is used to inform the player of the period of time in an easily understandable manner. The gauge automatically grows from zero to a predetermined length as time passes. Then, when the pressed button 38B is released, that is, the button 38B returns to the state before being pressed, the gauge disappears from the game screen. In the above, the ball object 58 is kicked by the soccer player object 54, to be moved the flight distance corresponding to the period of time elapsed after pressing the button 38b before releasing the pressed button 38B, or the length of the gauge.

Figure 4:
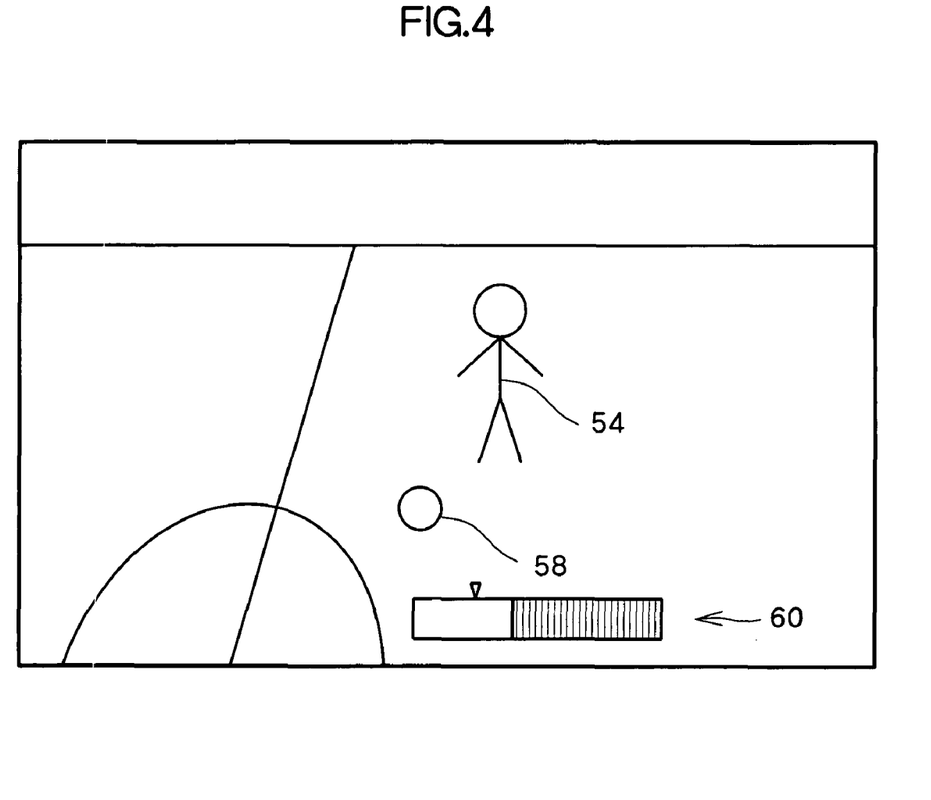
FIG. 4 is a diagram showing one example of a game screen shown on the monitor.
Figure 5:
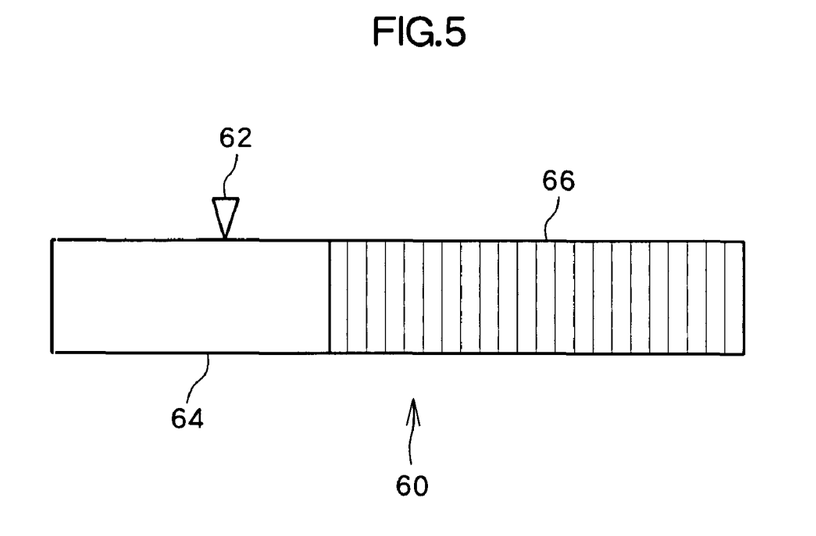
FIG. 5 is a diagram showing one example of a gauge.

FIG. 4 is a diagram showing one example of a game screen shown on the monitor 18. FIG. 5 is an enlarged diagram showing one example of a gauge shown on the game screen. The image of the game screen shown in FIG. 4 is produced by superimposing an operation guidance image onto a space image. The space image is formed by visualizing the picture obtained by viewing from the view point defined in the virtual three dimensional space 50 where the soccer field object 52 is placed, in the sight line direction which is also defined in the virtual three dimensional space 50. The operation guidance image contains a gauge 60 which appears in response to the button 38B pressed.

As shown in FIG. 5, the gauge 60 comprises a rectangle frame image 64 and an expansion image 66 aligned at the right side within the frame image 64 and growing automatically. A marker 62 is shown above the frame image 64. The marker 62 serves as a guide for the player wishing to move the ball object 58 to a desired position. Specifically, by releasing the pressed button 38B at the time when the expansion image 66, fixed at its right end to the right end of the frame image 64, grows to such an extent that the left end thereof reaches the point indicated by the marker 62, the player can move the ball object 58 to the desired position.

Figure 6:
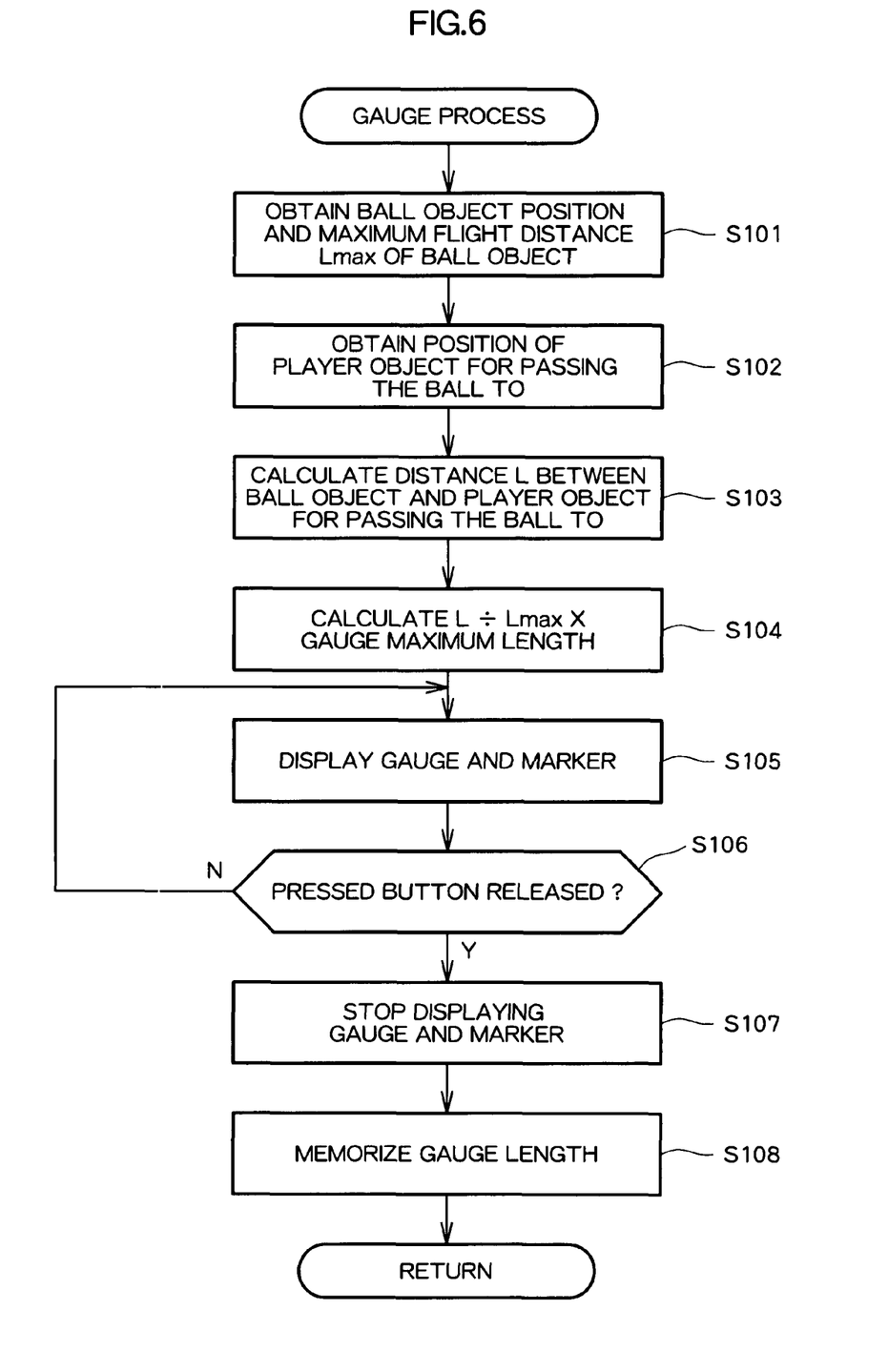
FIG. 6 is a flowchart showing a gauge process carried out by the game device according to the embodiment of the present invention.

FIG. 6 is a process flowchart for the game device 10 to display the gauge 60. The process described in FIG. 6 is realized by the consumer game machine 11 by carrying out a program stored in the DVD-ROM 25. Specifically, the process is carried out in response to the button 38B pressed by the player with the player object 54, or the object subjected to the player's operation, holding the ball object 58. The process is applied to move the ball object 58 from the position of the player object 54 to the position of the player object 56 (that is, to pass the ball to their teammate).

As shown in FIG. 6, in the gauge process, the present position of the ball object 58 held by the player object 54, or the object subjected to the player's operation, in the virtual three dimensional space 50, and the maximum flight distance Lmax in the case where the player object 54 kicks the ball object 58 are obtained (S101). In the above, the position of the player object 54 may be obtained instead of the ball object 58. In the above, the player object 54, or the object subjected to the player's operation, may be determined according to a publicly known algorithm, such as by finding a player object located closest to the ball object 58 and determining that player object as the player object 54. The maximum flight distance Lmax may be stored in advance corresponding to each of the player objects, for example.

Thereafter, the input direction (any of the upper, lower, rightward, leftward, right upper, right lower, left lower, and left upper directions) of the direction key 34 of the controller 32, or the direction designated using the direction key 34, is determined based on the operational signal sent from the controller 32, and the position of the player object located in that direction in the virtual three dimensional space 50 is obtained (S102). For example, distances between the respective player objects belonging to the same team as that of the player object 54, or the object subjected to the player's operation, among the player objects placed on the soccer field object 52, and the straight line originating from the player object 54 and extending in the direction designated using the direction key 34, are obtained. Then, a relevant position on the movement path, or a focused position, is obtained for the shortest distance.

Then, the distance L between the position obtained at S101, namely, the present position of the ball object 58 held by the player object 54, and the position obtained at S102 are calculated (S103).

Further, the distance L is divided by the maximum flight distance Lmax, also obtained at S101, and further multiplied by the maximum length of the expansion image 66, that is, the width of the frame image 64 (S104). Thereafter, the gauge 60 shown in FIG. 5 is displayed on the game screen. In displaying the gauge 60, the marker 62 is additionally displayed above the gauge 60, indicating a point displaced from the right end of the gauge 60 by the length calculated at S104 (S105). The display of the gauge 60 and the marker 62 is kept updated until the pressed button 38B is released (S106). Specifically, the gauge 60 grows with every update of the display.

When the pressed button 38B is released, the display of the gauge 60 and the marker 62 is suspended, and then disappears from the game screen (S107). The length of the expansion image 66 of the gauge 60, that is, the period of time elapsed after pressing the button 38B before releasing the pressed button 38B, is stored in the main memory 26 (S108) before the main routine (not shown) resumes. The length of the expansion image 66 stored in the main memory 26 is used in determination of a distance by which to move the ball object 58.

According to the above-described game device 10, the marker 62 is shown above the gauge 60, and the position at which to display the marker 62 is determined based on the distance between the ball object 58 and the player object to which the ball object 58 is to be passed. This arrangement helps the player readily understand the time, that is, the length of the gauge at the time when they ought to release the pressed button 38B in order to pass the ball object 58 to another player object. Therefore, the usability of the game improves.

It should be noted that the present invention is not limited to the above-described embodiment.

For example, although a case is described in the above in which the present invention is applied when the ball object 58 is aimed to be moved to the position of a teammate player object, the present invention is also applicable when the ball object 58 is moved in any other direction.

Figure 7:
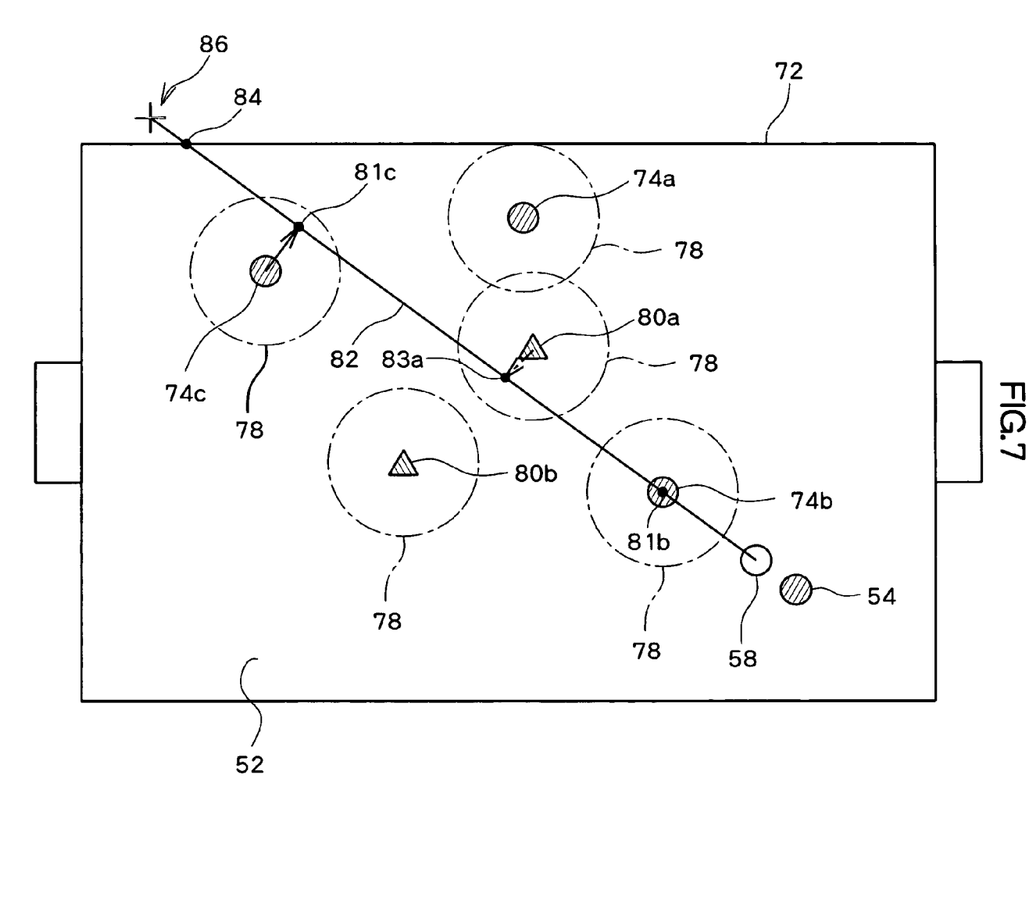
FIG. 7 is a diagram showing a relationship between a movement path and a focused position of a ball object in moving the ball object in a desired direction.

FIG. 7 is a diagram showing a method for determining a focused position on a movement path in moving the ball object 58 in a desired direction. As shown in FIG. 7, in moving the ball object 58 in a desired direction on the soccer field object 52, the movement path 82 of the moving ball object 58 is initially calculated. The movement path 82 may be, for example, a straight line originating from the ball object 58 serving as an original point and extending the maximum flight distance Lmax in the direction in which the player object 54, or the object subjected to the player's operation, is located. Alternatively, the movement path 82 may be a curved line displaced rightward or leftward relative to the straight line according to the wind direction data set for the virtual three dimensional space 50, the dominant leg data set for the player object 54, or the object subjected to the player's operation, the content of operation carried out using the controller 32, or the like.

Thereafter, the positions of all player objects 74, 80 placed on the soccer field object 52 other than the player object 54 are obtained, and the shortest distances between the positions of the respective player objects 74, 80 and the movement path 82 are calculated. When the obtained distances are smaller than a predetermined value, it is determined that the ball object 58 moves, traversing the ranges of movements 78 of the respective player objects 74, 80, and that the positions of the player objects 74, 80 (the player objects 74b, 80a, 74c here) are used in calculation of the focused position. Specifically, the positions of the feet of vertical lines drawn from the respective positions of the player objects 74b, 80a, 74c toward the movement path 82 are calculated, and the positions on the movement path 82 are determined as focused positions 81c, 83a, 81b. In addition, the position where the movement path 82 crosses the touch line 72 is also determined as a focused position 84.

It should be noted that, in FIG. 7, the player characters 74a, 74b, 74c who belong to the team (the own-side team) to which the player character 54, or the object subjected to the player's operation, belongs are each shown as a circle with diagonal lines, while the player characters 80a, 80b who belong to the other team (the opponent team) are each shown as a triangle with diagonal lines.

Figure 8:
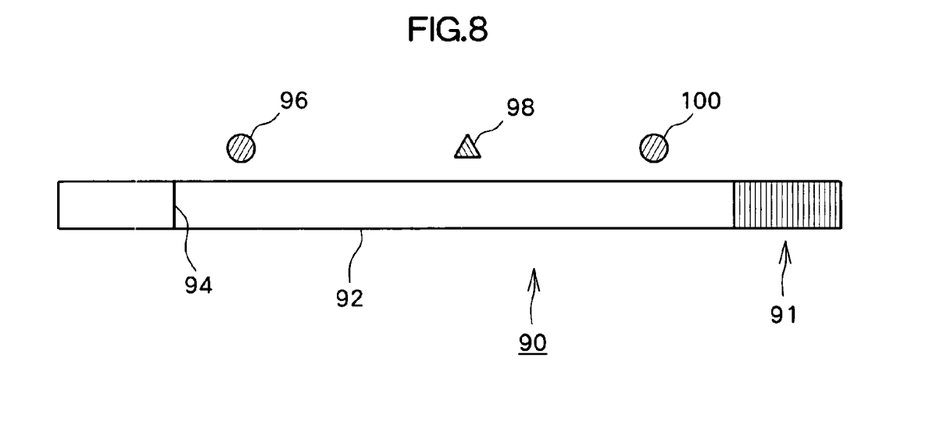
FIG. 8 is a diagram showing a modified example of the gauge.

FIG. 8 shows a gauge displayed on the monitor 18, utilizing the focused positions 81c, 83a, 81b, 84, shown in FIG. 7. The gauge 90 shown in FIG. 8 contains a rectangular frame image 92 and an expansion image 91 aligned at the right side inside the frame image 92 and automatically growing. Markers 96, 98, 100 are shown above the frame image 92. The position where the marker 96 is displayed is determined based on the distance between the position of the ball object 58 and the focused position 81c, and the marker 96 is shown with a design pattern representing the team of the player object 74c corresponding to the focused position 81c. Similarly, the display position of the marker 98 is determined based on the distance between the position of the ball object 58 and the focused position 83a, and the marker 98 is shown with a design pattern representing the team of the player object 80a corresponding to the focused position 83a. The display position of the marker 100 is determined based on the distance between the position of the ball object 58 and the focused position 81b, and the marker 100 is shown with a design pattern representing the team of the player object 74b corresponding to the focused position 81b.

In the gauge 90, a touch line position image 94 is displayed within the frame image 92. The display position of the touch line position image 94 is determined based on the distance between the focused position 84 and the position of the ball object 58.

Figure 9:
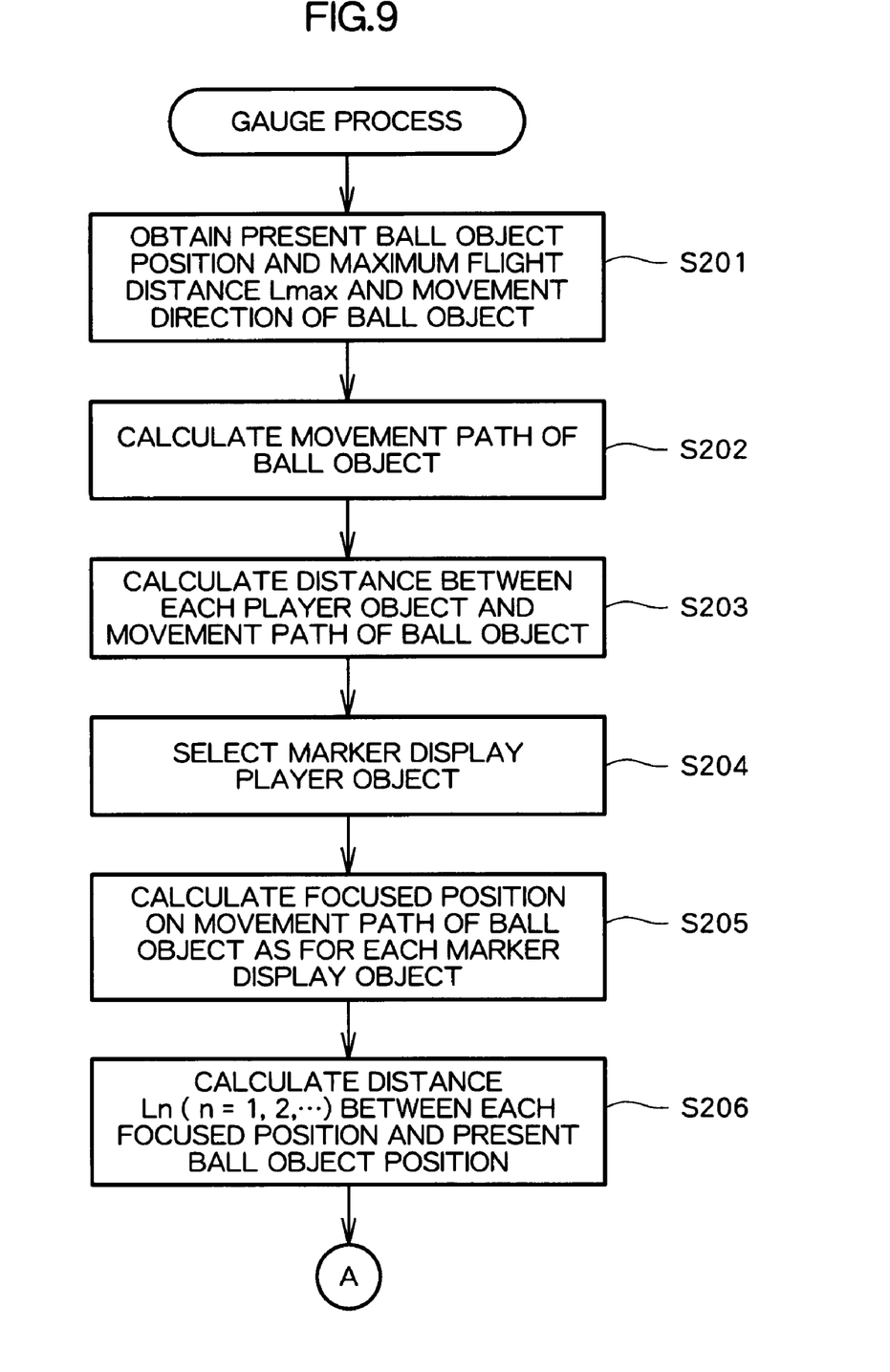
FIG. 9 is a flowchart showing a gauge process according to a modified example.
Figure 10:
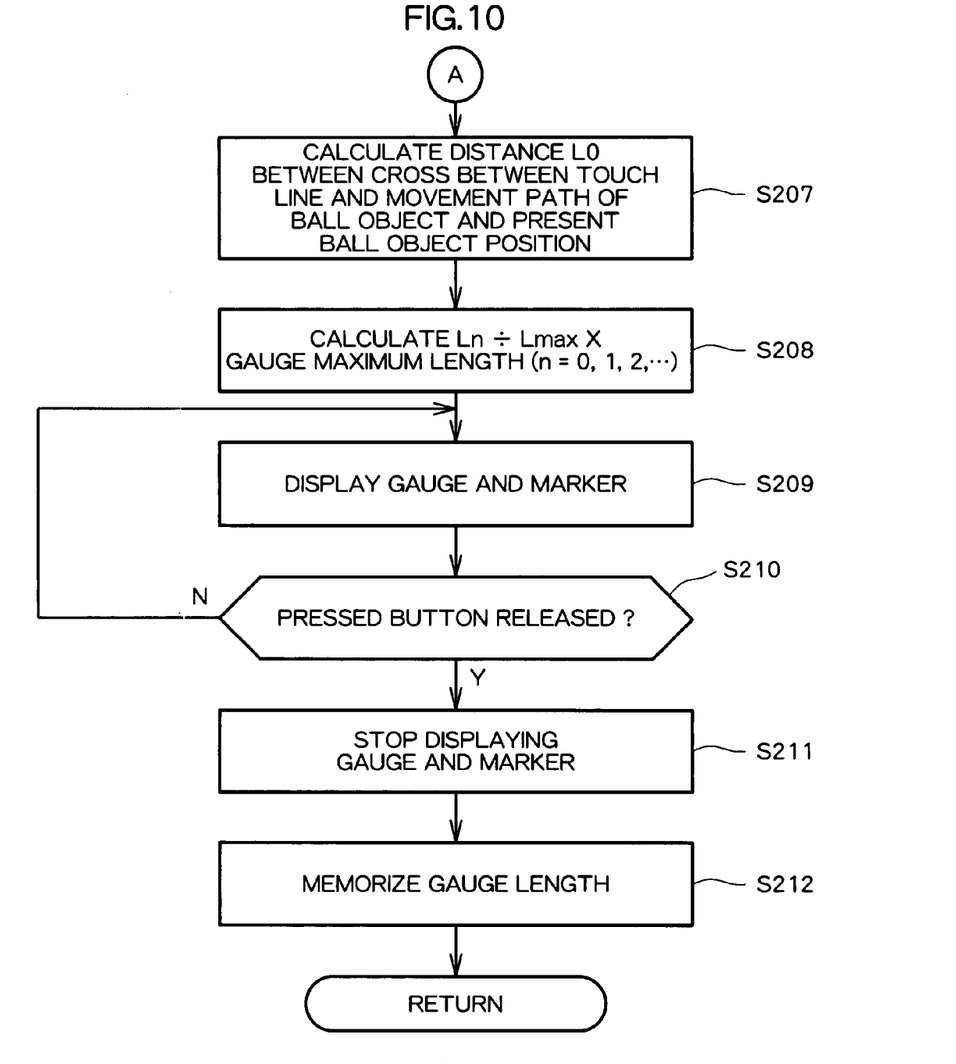
FIG. 10 is a flowchart showing a gauge process according to the modified example.

FIGS. 9 and 10 are process flowcharts for the game device 10 to display the gauge 90. The process described in the drawings is realized by the consumer game machine 11 by executing a program stored in the DVD-ROM 25. Specifically, this process is triggered in response to the player pressing the button 38B with the player object 54, or the object subjected to the player's operation, holding the ball object 58. This process is applied to move the ball object 58 from the position of the player object 54 to any position in any direction designated using the direction key 34.

As shown in the drawings, in the gauge process, the present position of the ball object 58 held by the player object 54, or the object subjected to the player's operation, in the virtual three dimensional space 50, and the maximum flight distance Lmax and the direction in which the ball object 58 is moved when the player object 54 kicks the ball object 58, are obtained (S201). The direction in which the ball object 58 is moved is designated using the direction key 34. In this case as well, the position of the player object 54, or the object subjected to the player's operation, may be obtained instead of the position of the ball object 58.

Thereafter, the movement path of the ball object 58 is calculated based on the information obtained at S201 (S202). The movement path may be a three dimensional orbit itself in the virtual three dimensional space 50 or a projection thereof onto the soccer field object 52. Then, the position coordinates of the player objects placed on the soccer field object 52 other than the player object 54, or the object subjected to the player's operation, are obtained, and the distances between the respective coordinates and the movement path calculated at S202 are calculated (S203).

Then, the player object relevant to the distance smaller than a predetermined threshold is selected as a player object in connection with which a marker is displayed, or a marker display player object (S204). Then, for each of the marker display player objects, a focused position on the movement path of the ball object 58 is calculated (S205). Specifically, the coordinates of the feet of vertical lines drawn from the respective positions of the marker display player objects toward the movement path of the ball object 58 are calculated, and determined as focused positions. Then, a distance Ln (n=1, 2, . . . ) between each of the focused positions and the present position of the ball object 58 is calculated (S206).

Thereafter, a point where the touch line 72 crosses the movement path is calculated and determined as a focused position. Then, the distance L0 between the focused position and the present position of the ball object 58 is calculated (S207 in FIG. 10). The distance Ln (n=0, 1, 2, . . . ) is divided by the maximum flight distance Lmax, and then multiplied by the maximum length of the gauge 90 to thereby calculate a marker display position relevant to each of the focused positions (S208).

Thereafter, the gauge 90 shown in FIG. 8 is displayed on the game screen. In the above, markers 96, 98, 100 are displayed on the upper edge of the gauge 90, indicating the positions displaced from the right end of the gauge 90 by the amounts corresponding to the respective values calculated at S208 (S209). The display is kept updated until the pressed button 38B is released (S210). The expansion image 91 of the gauge 90 grows with every update of the display. Then, with the pressed button 38B released, display of the gauge 90 and the markers 96, 98, 199 is suspended (S211), and disappears from the screen. Then, the length of the expansion image 91 of the gauge 90, that is, the period of time elapsed after pressing the button 38B before releasing the pressed button 38B, is stored in the main memory 26 (not shown) (S212) before the main routine resumes. The length of the expansion image 91 stored in the main memory 26 is used in determination of a distance by which to move the ball object 58.

In this modified example, when moving the ball object 58 in a desired direction with a player object present near the movement path, a point on the movement path, which is closest to the position of the player object is calculated as a focused position. Then, a marker is displayed at a position on the upper edge of the gauge 90, which corresponds to the distance between the focused position and the position of the ball object 58 (the position before the movement). This arrangement helps the user promptly know the time, that is, the length of the gauge at the time when they ought to release the pressed button 38B in order to move the ball object 58 to close to another player object.

Figure 11:
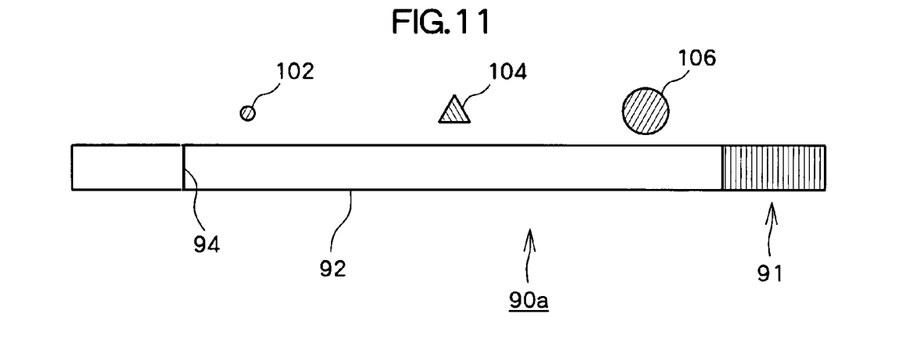
FIG. 11 is a diagram showing a gauge according to another modified example.
Figure 12:
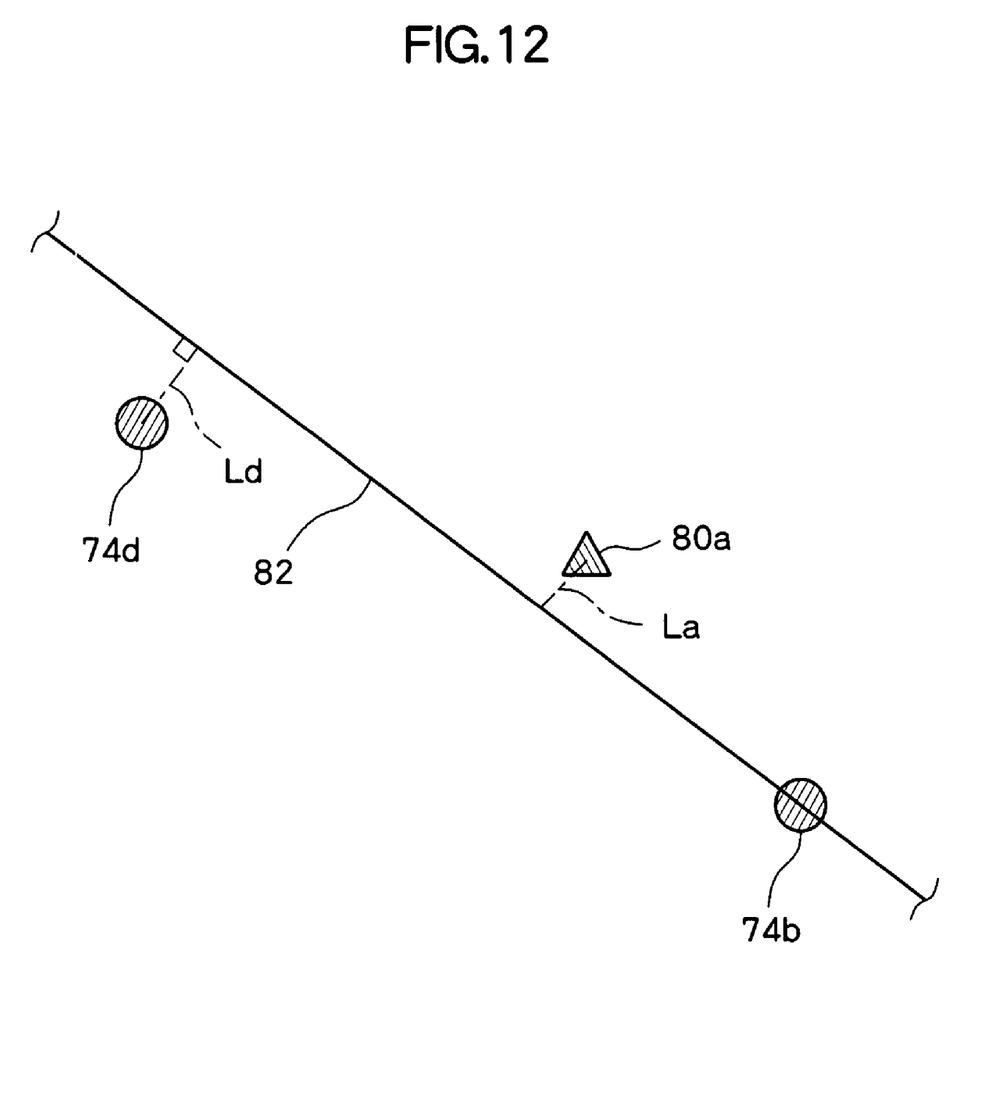
FIG. 12 is a drawing explaining a gauge process according to another modified example.

FIG. 11 shows a modified example of the gauge 90 shown in FIG. 8. In the gauge 90a shown in FIG. 11, the markers 102, 104, 106 are displayed on the upper edge of the frame image 92 in different sizes which are determined based on the distance Ld, La, 0 between the player objects corresponding to the respective markers 102, 104, 106 and the movement path of the ball object 58, that is, the distances between the positions of the player objects 74d, 80a, 74b and the corresponding focused positions. This arrangement helps prompt recognition of the distances between the player objects corresponding to the respective markers 102, 104, 106 and the movement path of the ball object based on the sizes of the respective markers 102, 104, 106.

It should be noted that although the sizes of the markers are made different depending on the distances between the player objects corresponding to the respective markers and the movement path of the ball object in the above, this is not an exclusive example. Alternatively, different colors or degrees of transparency, or the like, of the markers may be employed for display. For a marker that is a flashing image, the flashing rate may be changed.

When the markers are displayed in different manners depending on the distances between the respective positions of the player objects corresponding to the markers and the movement path of the ball object 58, the manners of displaying the marker may be changed in a stepwise manner or in a gradually increasing or decreasing manner depending on the range of the distance.

It should be noted that although an example in which the present invention is applied to a soccer game is described in the above, application of the present invention is not limited to this example, and the present invention is applicable to any ball game, such as a golf game, or the like, for example. Further, the present invention is also applicable to any device, other than a ball game, in which an amount of operation is input.

Also, although the marker 62 or the like is used to indicate the time at which to release the pressed button 38B in the above-described embodiment, any other image may be used for the indication. Alternatively, the frame image 64 or the like may be displayed in different colors with a border at a position according to the value calculated at S104, so that the colors indicate the time at which to release the pressed button 38B.

The invention claimed is:

1. A game device, comprising:
   means for displaying a gauge automatically grows in a length thereof as time passes, up to no more than a maximum length indicative of a maximum flight distance of an object;
   means for monitoring whether a player carries out an operation; and
   means for moving, in a case where the player carries out the operation, the object placed in a virtual three dimensional space by a distance according to the length of the gauge displayed by the means for displaying,
   the game device, further comprising:
   means for obtaining a focused position on a movement path of the object and positions of player objects representative of first players on a same team including said player and second players on an opposing team to said player;
   means for calculating a distance between the focused position obtained by the means for obtaining and a present position of the object, and the shortest distances between the movement path and each of said player objects other than the player object of the player,
   wherein a length of the gauge corresponding to the distance calculated, and wherein said player objects corresponding to the shortest distances which are smaller than a predetermined distance are displayed as respective markers on the gauge; and means for presenting the length of the gauge to which the gauge displayed by the means for displaying aims to be set, based on the length, wherein the player carries out said operation so as to move, via said means for moving, the object to a desired position based at least one of (a) a team status and (b) the shortest distances between said movement path and each of said player objects that are displayed as said respective markers, displayed along said length of said gauge.

2. The game device according to claim 1, wherein the means for obtaining obtains the focused position on the movement path based on a position of another object placed in the virtual three dimensional space and the movement path.

3. The game device according to claim 2, wherein the means for presenting calculates a distance between the position of the other object and the movement path, and displays an image expressed in a manner according to the distance in a position in the gauge, which is in accordance with the length calculated.

4. The game device according to claim 1, wherein
the game device is formed as a soccer game,
the ball object representative of a ball and a plurality of player objects respectively representative of a plurality of players are placed in the virtual three dimensional space,
the means for moving moves the ball object, and
the means for obtaining obtains the focused position based on a position of the player object.

5. A method, comprising:
displaying a gauge which changes a length thereof as time passes;
monitoring whether or not a player carries out an operation; and
in a case where the player carries out the operation, moving an object placed in a virtual three dimensional space, within that virtual three dimensional space, by a distance according to the length of the gauge displayed by the displaying,
the method, comprising:
obtaining a focused position on a movement path of the object;
calculating a distance between the focused position obtained by the obtaining and a present position of the object;
calculating a length of the gauge corresponding to the distance based on the distance calculated; and
presenting the length of the gauge on a display to which the gauge displayed by the gauge display step aims to set, based on the length calculated.

6. A non-transitory information storage medium storing a program causing a computer to function as:
means for displaying a gauge which automatically grows in a length thereof as time passes, up to no more than a maximum length indicative of a maximum flight distance of an object;
means for monitoring whether a player carries out an operation;
means for moving the object, placed in a virtual three dimensional space, within that virtual three dimensional space by a distance according to the length of the gauge displayed by the means for displaying in a case where the player carries out the operation;
means for obtaining a focused position on a movement path of the object in a case where the player carries out the operation and positions of player objects representative of first players on a same team including said player and second players on an opposing team to said player;
means for calculating a distance between the focused position obtained by the means for obtaining and a present position of the object, and the shortest distances between the movement path and each of said player objects other than the player object of the player,
wherein a length of the gauge corresponding to the distance calculated, and wherein said player objects corresponding to the shortest distances which are smaller than a predetermined distance are displayed as respective markers on the gauge; and
means for presenting the length of the gauge to which the gauge displayed by the gauge display means aims to be set, based on the length calculated, wherein the player carries out said operation so as to move the object to a desired position based on at least one of (a) a team status and (b) the shortest distances between said movement path and each of said player objects that are displayed as said respective markers, displayed along said length of said gauge.

7. A game device including a computer-readable medium and a processors having a set of instructions to generate a game in a virtual three-dimensional space, comprising:
a gauge which automatically grows in length as a function of time, up to no more than a maximum length indicative of a maximum flight distance of an object;
said object in a virtual three dimensional space, said object being moved by a distance when a player carries out an operation, according to the length of the gauge displayed,
a focused position on a movement path of the object that is positioned a distance from a present position of the object and positions of player objects representative of first players on a same team including said player and second players on an opposing team to said player;
wherein a length of the gauge corresponds to the distance calculated between the focused position obtained by the means for obtaining and a present position of the object, and the shortest distances between the movement path and each of said player objects other than the player object of the player, and wherein said player objects corresponding to the shortest distances which are smaller than a predetermined distance are displayed as respective markers on the gauge,
said length representing a desired length of movement by a user of the game, and the player carries out said operation so as to move the object to a desired position based on at least one of (a) a team status and (b) the shortest distances between said movement path and each of said player objects that are displayed as said respective markers, displayed along said length of said gauge.

8. The game device according to claim 7, wherein the focused position is based on a position of another object placed in the movement path.

9. The game device according to claim 8, further comprising an image representative of a distance between the position of the other object and the movement path, said image being displayed according to the distance in a position in the gauge, in accordance with the length.

10. The game device according to claim 7, wherein the game device is a soccer game, a ball object is representative of a ball and a plurality of player objects are respectively representative of a plurality of players, the ball object being moved, and the focused position is based on a position of the player object.

* * * * *